Figure 1:
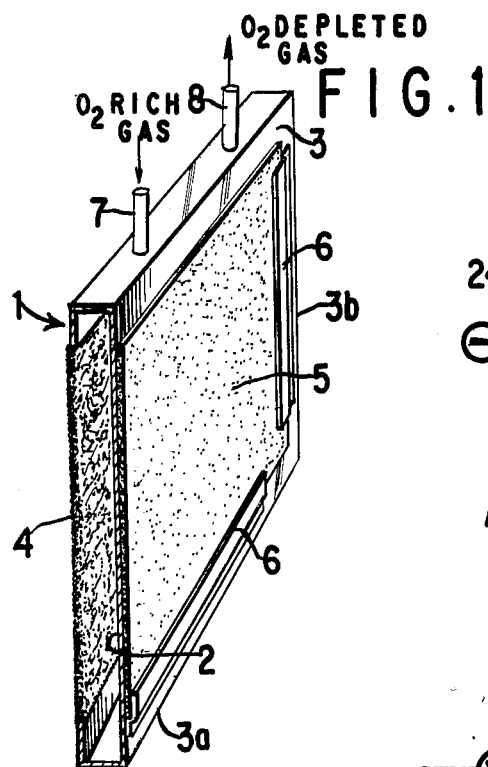

United States Patent [19]

de Nora et al.

[11] 4,246,324
[45] Jan. 20, 1981

[54] CONSUMABLE REPLACEABLE ANODES FOR BATTERIES

[75] Inventors: Vittorio de Nora, Nassau, The Bahamas; Placido M. Spaziante, Lugano, Switzerland

[73] Assignee: Diamond Shamrock Technologies S.A., Geneva, Switzerland

[21] Appl. No.: 28,364

[22] Filed: Apr. 9, 1979

[51] Int. Cl.³ .......................................... H01M 12/06
[52] U.S. Cl. ........................................ 429/17; 429/27;
429/34; 429/210; 429/96
[58] Field of Search ..................... 429/17, 27, 34, 38,
429/39, 210, 12, 19, 96

[56] References Cited

U.S. PATENT DOCUMENTS

| | | | |
|---|---|---|---|
| 3,479,226 | 11/1969 | Oswin | 429/17 |
| 3,533,847 | 10/1970 | Maurer | 429/34 |
| 3,598,655 | 8/1971 | Hamlen et al. | 429/27 |
| 3,682,706 | 8/1972 | Yardney et al. | 429/27 |
| 3,682,706 | 8/1972 | Yardney et al. | 429/34 X |
| 3,713,892 | 1/1973 | Moran | 429/17 |
| 3,717,505 | 2/1973 | Unkle, Jr. et al. | 429/27 |
| 3,741,810 | 6/1973 | Dafler et al. | 429/38 X |
| 3,898,102 | 8/1975 | Louis et al. | 429/210 |
| 4,115,626 | 9/1978 | Sauer et al. | 429/27 |

Primary Examiner—Anthony Skapars
Attorney, Agent, or Firm—Hammond & Littell, Weissenberger and Muserlian

[57] ABSTRACT

A battery comprising an inert container housing a plurality of corrosion resistant gas depolarized metal cathode elements in hollow box-like form and consumable anode elements in spaced relationship with said cathode elements. At least one wall of each cathode element has a gas-permeable porous cathode formed of sintered particles impregnated with a catalyst and, on the inside, with a hydrophobic resin. The consumable anode elements are mounted on non-consumable metal supports so as to be removable (with or without their supports) and replaceable in the container. In operation, depolarizing gas is fed inside the cathode elements and an electrolyte is maintained between the facing cathodes and anodes.

27 Claims, 11 Drawing Figures

U.S. Patent  Jan. 20, 1981  Sheet 1 of 4  4,246,324

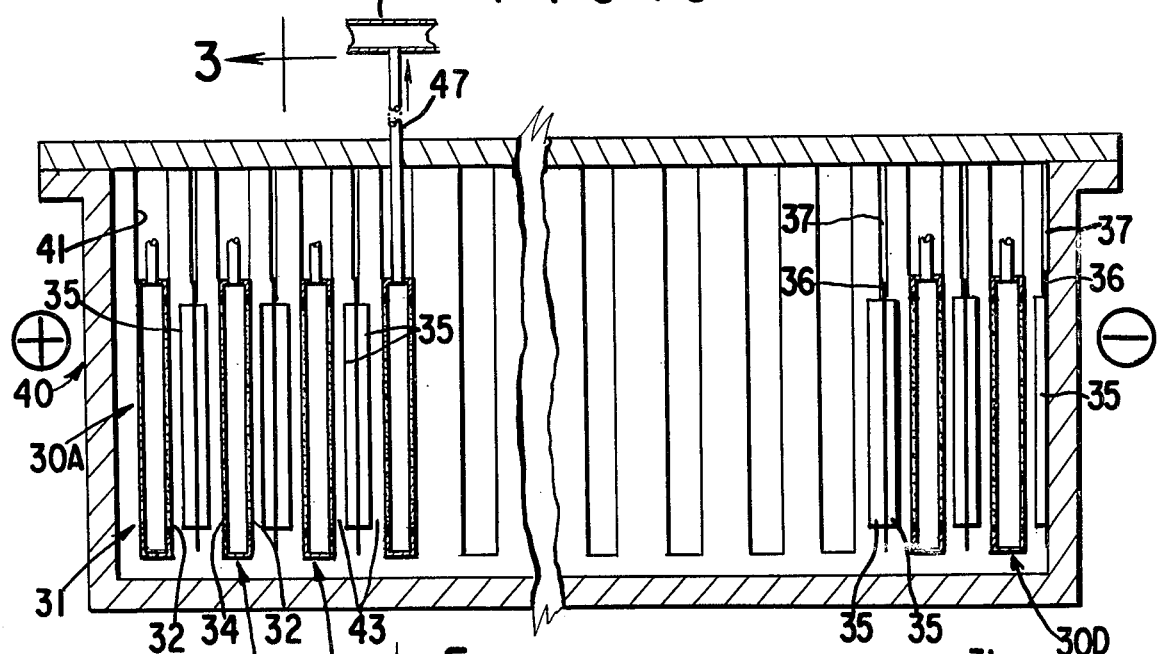
FIG. 5
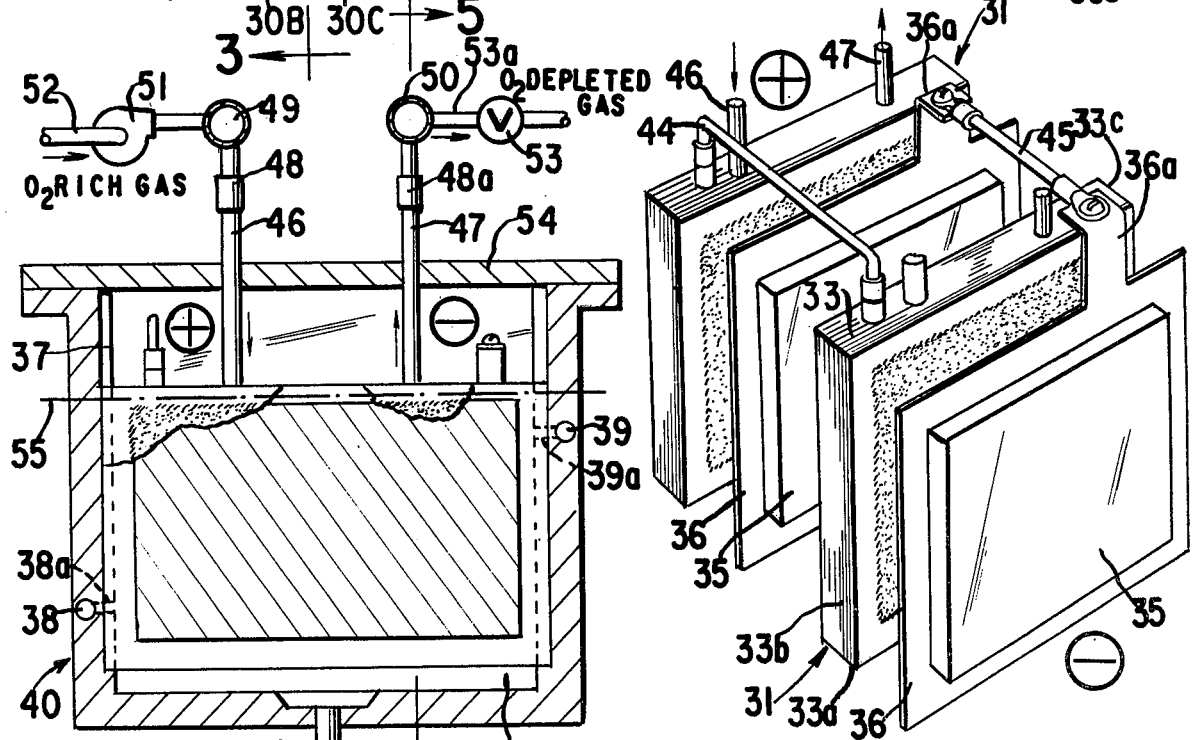
FIG. 7
FIG. 6

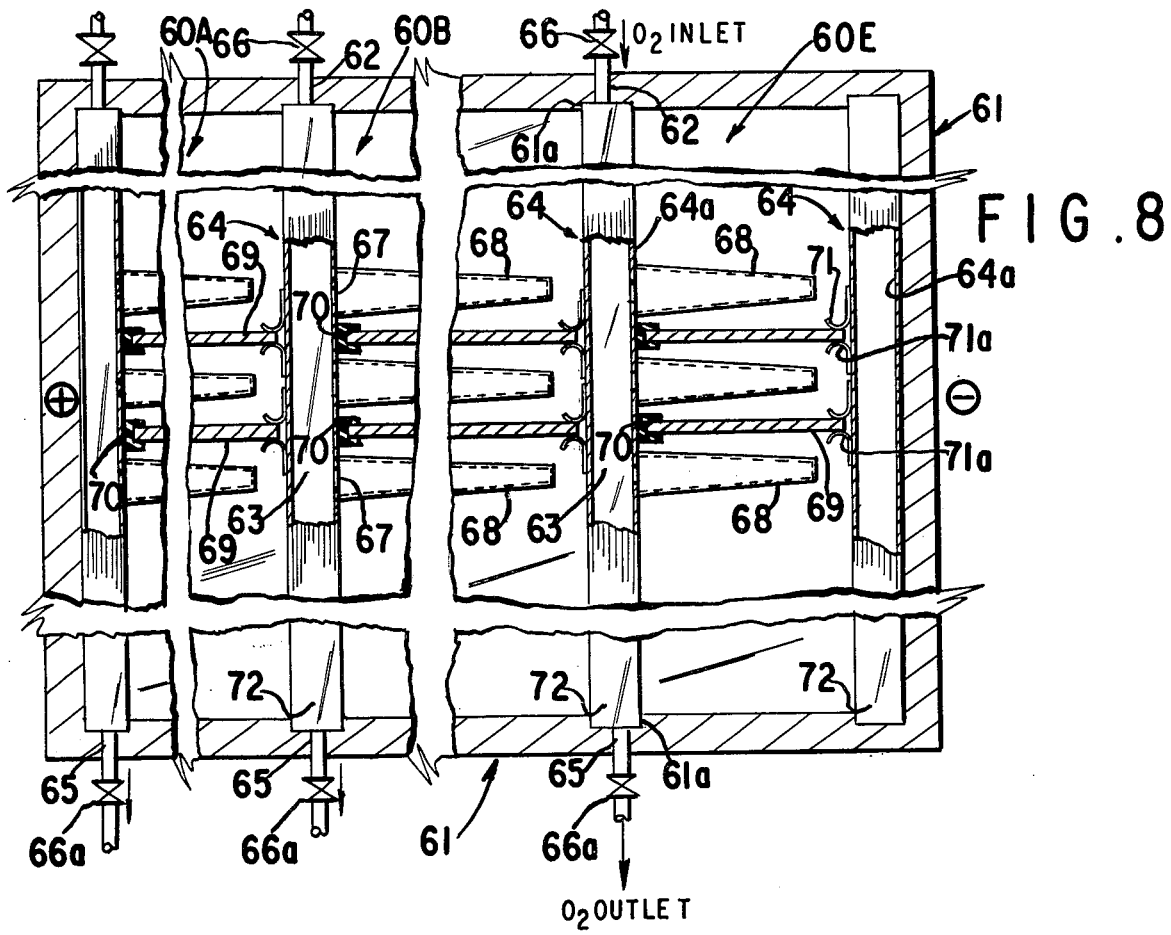
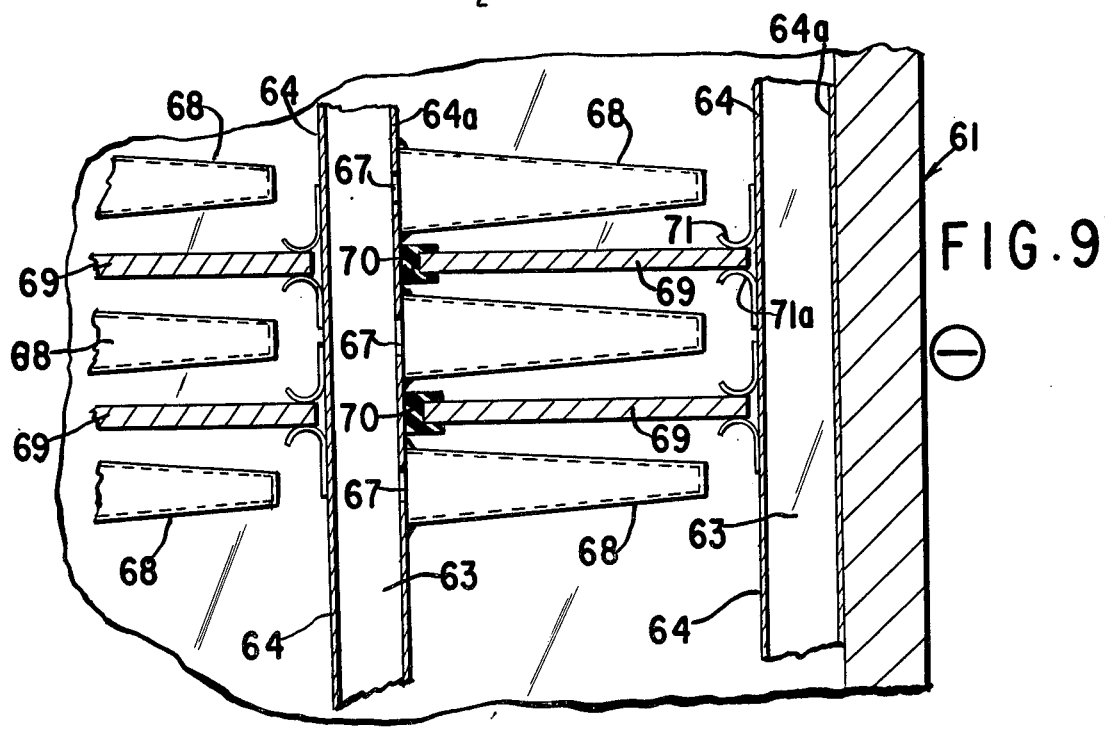

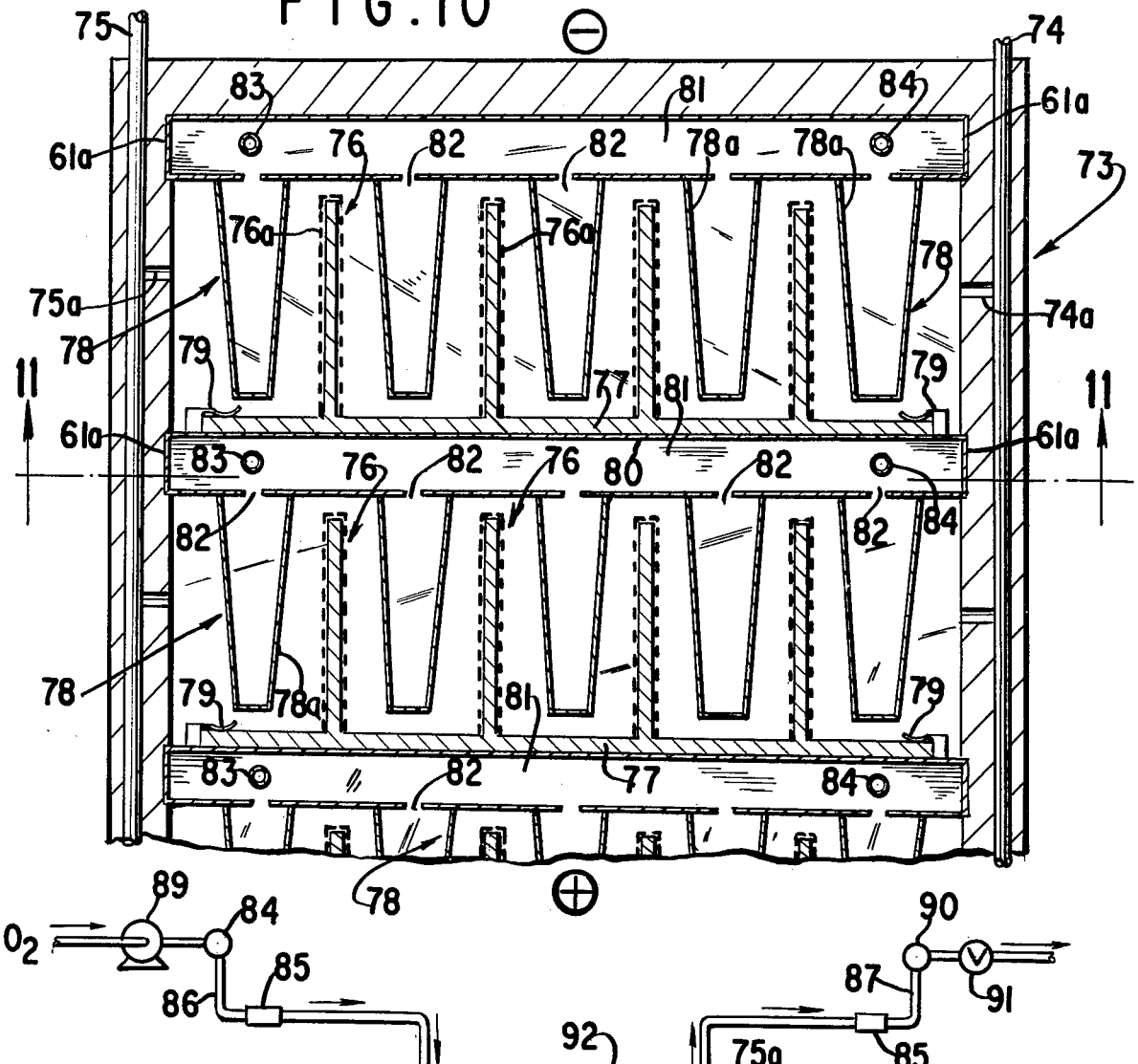

CONSUMABLE REPLACEABLE ANODES FOR BATTERIES

PRIOR ART

Storage batteries and other energy conversion systems in which one of the electrodes is a metal or metal alloy which goes into solution during the production of energy (discharge) and is redeposited during the storage of energy (charge) are well known. Some employ metal-to-metal couples such as nickel/cadmium or silver oxide/zinc couples. Other energy conversion apparatus use halogen or oxygen depolarized cathodes and consumable metal anodes such as, for example, zinc, iron, lead, lithium, manganese, and the like. In many cases, these energy conversion systems are recharged with the electrodes in place by redepositing or partially redepositing the consumable metal on the anode by applying an external potential to the individual units or the entire energy storage system. However, these batteries in practice are never completely restored or recharged to their original state and become progressively shorter-lived and must be out of use for considerable time during recharging.

Various U.S. patents, such as Oswin, U.S. Pat. No. 3,436,270, Rosansky, et al., U.S. Pat. No. 3,513,030, Fishman, U.S. Pat. No. 3,553,024, Loos, et al., U.S. Pat. No. 3,708,345, and others, describe batteries with anodes which are removable from and reinsertable into an enclosing cathode chamber. The anodes are usually of consumable metal, or consumable, compacted or sintered metal powder, mounted on conductive, porous metal supports or screens of various metals such as nickel, iron, copper, titanium, tantalum and alloys thereof. The removal and insertion of the anodes of such prior art batteries into the cathode chambers present problems because of shape changes in the anode structure during recharging outside the cathode chamber or envelope and because the electrolyte-impregnated paper separators in the cathode chambers are often torn or destroyed during removal or reinsertion of the recoated anodes.

THIS INVENTION

The anodes of this invention consist of rigid, thin corrosion resistant metal support blanks, such as titanium, tantalum, tantalum-coated titanium, zirconium, molybdenum, niobium, yttrium, tungsten or nickel, on which the consumable electrode metal, such as zinc, is deposited outside the cell, under the best conditions for such deposition, and the rigid anode support blank with the consumable metal redeposited thereon is inserted into the cell, opposite the cathode, and used until the consumable metal is substantially all consumed, whereupon the blank is removed from the cell and a new anode blank with consumable metal thereon is inserted, while the used blank is recoated with the consumable metal outside the cell.

Alternatively the consumable metal anode may be removably mounted in supports on the cathode box and when substantially consumed it may be removed from the cathode box and a new consumably anode inserted in said supports.

As zinc is the present preferred consumable anode material, this invention will be described with zinc as the exemplary anode, but it will be understood that other consumable anodic materials, such as, for example, iron, lithium, cadmium, or the like, are included in the scope of this invention and that this invention applies to any energy conversion system in which consumable anodes are used.

The cathode is preferably a box-like structure of a metal resistant to corrosion in the particular electrolyte used in the battery (i.e., titanium, tantalum, tantalum-coated titanium, zirconium, molybdenum, niobium, yttrium, tungsten or nickel), with a wall of sintered, porous metal on one or more faces impregnated or activated with a catalyst, such as the platinum group metals, including platinum black, platinum group metal oxides, or other catalytic metal oxides such as perovskites, delafossites, bronzes or spinel-type oxides. The activation of the sintered, porous metal wall is best effected by impregnating the degreased and slightly pickled, porous metal wall with a solution of decomposable salts of the catalyst metals, followed by heat treatment in an oxidizing or reducing atmosphere to decompose the salts and deposit the catalytic oxides or metal on the surfaces of the pores of the sintered wall.

The internal surface of the activated porous cathode, wall, that is, the surface towards the interior of the box-like structure, is impregnated with a lipophobic (e.g., hydrophobic) resin such as a polyethylene, polypropylene, polytetrafluoroethylene, polychlorofluoroethylene, various vinyl resins, and the like, in such a way as to let the resin penetrate inside the pores for a certain depth from the surface but without reaching through the full thickness of the porous cathode. The resin partially coats the surface of the pores near the internal surface of the cathode and imparts hydrophobic properties to the gas side layer of the porous cathode. This effectively reduces flooding of the box-like structure by the electrolyte and facilitates maintaining the three-phase boundary layer within the porous sections of cathode.

The electric coupling between each box-like cathode element and the adjacent anode element is through the electrolyte filling the spaces therebetween.

The electrolyte, held in a separate tank or reservoir, is continuously circulated through the various interelectrodic spaces in the battery by suitable distributor and collector pipes and/or conduits formed in the walls of the plastic battery container.

The interior of each box-like element communicates, by means of an inlet and an outlet port, respectively, with the supply line and the exhaust line for the cathode depolarizing gas (e.g., air, oxygen or other depolarizing gas) which is circulated inside each box-like element under superatmospheric pressure preferably slightly in excess of the pressure of the electrolyte on the outside of the porous cathode structure.

During discharge of electricity from the battery, the depolarizing gas such as oxygen or oxygen-containing gas is contacted with the inside of the porous cathode elements and the electrolyte contacts the outside of the cathode elements. The gas pressure applied internally to the activated porous cathode faces is adjusted to the pressure of the electrolyte, so that the electrolyte does not flood the pores of the cathode elements and gas does not blow through into the electrolyte. Aqueous alkaline electrolytes such as NaOH, KOH and mixtures of KOH and RbOH are preferred, but other electrolytes may be used.

With oxygen or air-depolarized cathodes and zinc-coated anodes, the reaction within the cell can be represented as:

At the cathode:

$$\tfrac{1}{2}O_2 + H_2O + 2e \rightarrow 2O H^{3l}$$

At the anode:

$$Zn + 2O H^{3l} \rightarrow ZnO + H_2O + 2e$$

Total cell reaction:

$$Zn + \tfrac{1}{2}O_2 \rightarrow ZnO$$

OBJECTS OF THE INVENTION

One of the objects of this invention is to provide metal battery cells having consumable anodes and gas-depolarized cathodes in box-like form in an inert battery container, in which the cathodes in box-like form may be removed and replaced in the battery container and the consumable portion of the anodes easily removed and renewed outside the cell container and re-used in the same or a similar cell container or in which only the consumable portion of the anodes may be removed and replaced without removing the box-like cathodes.

Another object is to provide hollow, box-like battery cell elements, of which the cathode is a porous, gas-permeable, $O_2$-reducing electrode and the anode is consumable, replaceable zinc or other metal, which can be removed and replaced in the same or a different inert plastic battery container.

Another object is to provide a battery container for removable and replaceable bipolar cell elements having means to circulate electrolyte in the spaces between adjacent cell elements and gas through said shallow, box-like cathode elements to activate the battery.

Another object is to provide cathodes for such battery cells having gas-permeable, oxygen-reducing elements in which electrolyte and gas are contacted when the battery is in operation.

Another object is to provide a bipolar gas-depolarized battery with hollow, porous, finger or tube shaped cathodes and solid or porous consumable anodes, which anodes are removable and replaceable by other anodes when partially consumed by the chemical reactons which take place in a battery.

Another object is to provide a battery with removable anodes and cathodes in which the anodes and cathodes are guided by means in the battery casing so that the anodes and cathodes do not contact each other during the removal of either from the battery casing.

Another object is to provide a rugged battery with no delicate parts or tearable envelopes which may be damaged in replacing anodes, whereby consumable anodes may be removed and replaced in the battery container without damage to any other parts of the battery.

Various other objects and advantages of the invention will appear as this description proceeds.

Referring now to the drawings, which are for illustrative purposes only and by which the principles of this invention will be described.

Figure 2:
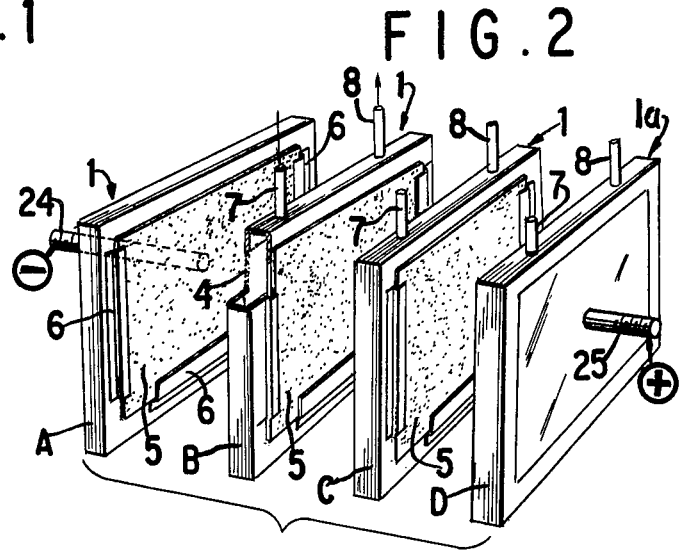
Figure 3:
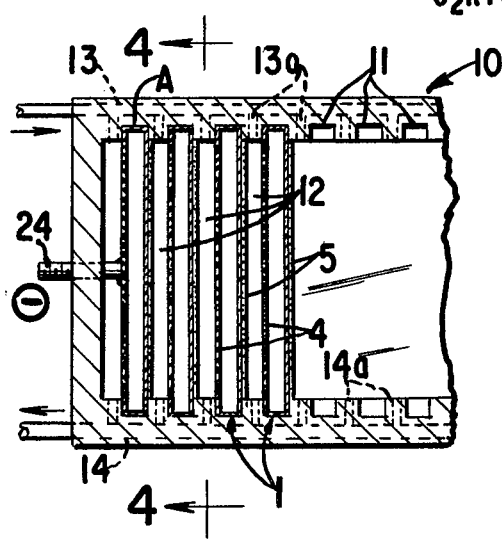
Figure 4:
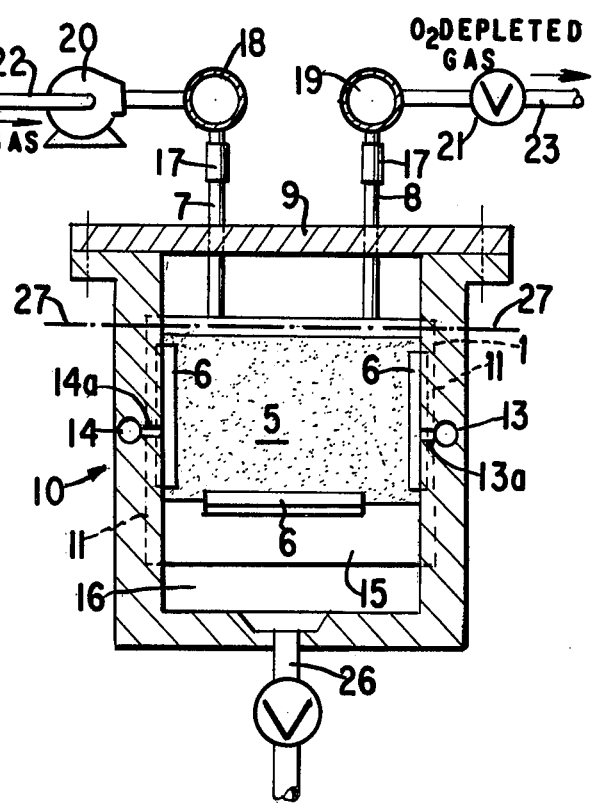

FIG. 1 is a perspective view of a box-type bipolar element,

FIG. 2 is an exploded view of four elements, namely, two intermediate bipolar elements and one cathodic and one anodic end element, FIG. 3 is a plan view of a battery container in which bipolar elements are insertable and removable to provide the desired number of cell units, FIG. 4 is a sectional view approximately on the line 4—4 of FIG. 3, FIG. 5 is a sectional side view (with parts omitted) approximately on the line 5—5 of FIG. 7 of another embodiment of a battery, with the anodes and cathodes each having a double face so that, except for the end elements, the anodes and cathodes are active on both the front and back faces thereof, FIG. 6 is an exploded perspective view of two cathode elements and two anode elements according to FIG. 5 with electrical connections therebetween, FIG. 7 is a sectional view along the line 3—3 of FIG. 5 showing the battery container into which the anodic elements, mounted on support plates, are insertable and removable to permit recoating of the anode elements outside the battery container, FIG. 8 is a part-sectional plan view of a battery container, in which the oxygen-depolarized cathodes and the replaceable anodes of this invention are shown, FIG. 9 is an enlarged detail of the anode/cathode structure of this embodiment, FIG. 10 is a sectional plan view of another embodiment of the invention, and FIG. 11 is a sectional view approximately on the line 11—11 of FIG. 10.

FIG. 1 to 4 and 8 to 11 illustrate bipolar embodiments of the invention and FIGS. 5 to 7 illustrate a monopolar embodiment.

As illustrated in FIG. 1, the replaceable bipolar units are individual, vertical, shallow, box-like cathode elements 1, of a valve metal, nickel, stainless steel or the like, each consisting of an imperforate front portion 2 on which consumable anodes 5 are mounted and U-shaped top, bottom and side pieces 3, 3a and 3b, preferably formed from one piece of metal, which form a frame for a porous, gas-permeable, cathode 4 formed of sintered, activated titanium or other valve metal, or nickel or stainless steel impregnated with catalytic materials such as the platinum group metals, oxides of the platinum group metals, mixed oxides thereof and other catalytic oxides such as spinels, perovskites, delafossites, bronzes and the like. The activated, sintered, porous cathode 4 is preferably formed separately and welded into the frame formed by the U-shaped parts 3, 3a and 3b.

The sintered, porous, gas-permeable cathode elements 4 (and 32 and 34, FIG. 5, hereafter described) are made of any corrosion-resistant metal, preferably formed by sintering particles of the corrosion-resistant metal by known techniques, such as those commercially used to make metallic filter plates and tubes, to obtain a structure with a porosity of 30% to 65%. The sintered, porous cathode sections may be silicon or a valve metal such as titanium, tantalum, tungsten, zirconium, niobium, hafnium, vanadium, yttrium, or alloys thereof, nickel or stainless steel. The particles are preferably spherical and have a narrow size distribution. Preferred size ranges in mesh number are 10 to 30, 30 to 50, 50 to 70 and 100 to 150, with the preferred ranges being the coarser ones, such as 10 to 30 and 30 to 50. With these preferred particle size ranges, the catalyst-impregnated and coated cathode of the invention retains a porosity of about 50% and a very high permeability to both liquids and gases. Gas pressure with reference to porosity is regulated so that liquid electrolyte does not flood the pores of the cathode and gas does not blow through into the electrolyte.

The surfaces of the sintered, porous cathodes 4 facing the inside of the cathode boxes, are preferably impregnated with a hydrophobic resin such as a fluorocarbon resin, in order to make the inner cathode surface substantially impermeable to the aqueous electrolyte while maintaining the side facing outwardly unaltered as to its permeability to electrolyte. The hydrophobic coating in conjunction with the positive pressure exerted by the gas inside the box-like elements 1 substantially avoids percolation of electrolyte into the box-like elements. However, draining means may be provided in the box-like elements 1 to dispose of minor or accidental flooding of the box-like elements.

On the front wall 2 of the box-like bipolar element 1, a consumable and replaceable anode 5 formed of a sheet of zinc or other consumable anodic material is removably mounted. The anode sheet 5 is conductively and mechanically connected to the imperforate wall 2 by means of spring clips 6, which are conveniently made by welding suitably shaped strips of the metal along the two vertical edges of the wall 2 and a horizontal strip at the bottom of the two vertical strips. The anode 5 can easily be inserted by simply slipping it inside the vertical spring clips 6 until it engages with the bottom clip. Removal of substantially consumed anodes is a simple and rapid operation. The anodes 5 may be flat or corrugated sheets of solid or porous zinc or other consumable metal.

Suitable extractors may be provided which, engaging with holes (not shown) in the top portion of the zinc sheets, will facilitate the removal operation.

Both the anodes 5 and the porous cathodes 4 are smaller in size than the overall dimensions of the box-like elements 1, so that inoperative edge portions are provided around the box-like elements 1 which fit into slots or other spacers 11 provided in the battery container described below.

Inlets 7 and outlets 8 are provided for introducing depolarizing gas and maintaining the required gas pressure inside the hollow, box-like elements 1.

Other means beside the spring clips shown in FIG. 1 may be provided to connect the consumable anodes 5 mechanically and electrically to the box-like structures. For example, a thermoplastic, electrically conductive cement may be used for spot-bonding the sheets 5 to the wall 2 of the box-like elements. However, the use of clips is preferred because the consumable anodes can be removed and reinserted without removing the box-like elements from the container of the battery, thus reducing the time necessary for "recharging" the battery.

FIG. 2 is an exploded view of four box-like elements 1 showing them in their electrical series spatial disposition. Each cathode 4 faces the anode 5 of the adjacent element.

The first element A of the series has an imperforate wall in place of the cathode 4, has an anode 5 carried in clips 6 thereon and is connected to the negative terminal of the battery which becomes the positive pole when the battery is connected to an external load. Similarly, the last element D, which has a cathode 4 and does not carry an anode, is connected to the positive pole of the battery. Two bipolar elements B and C are operatively inserted between the two terminal (half-cell) elements A and D, but any number of bipolar elements may be so inserted to provide the desired battery voltages.

The bipolar element B has its porous cathode 4 (visible in the cutout corner of element B) facing the anode 5 of the terminal element A and its anode 5 facing the porous cathode 4 (not visible) of the adjacent bipolar element C, and so on.

The gas inlets 7 and outlets 8 of elements B,C and D communicate with a distribution manifold and an exhaust manifold whereby air, oxygen or other depolarizing gas, is circulated into these box-like elements under a regulatable pressure.

FIG. 3 is a sectioned plan view of a battery container made of inert material such as plastic, hard rubber or the like, and provided with spaced slots 11 or other spacing means, into which the box-like elements 1 are inserted. The slots or spacing means 11 do not extend to the bottom of the container 10, so that there is a space 16 for circulation, drainage, etc., of the electrolyte below the elements 1.

When the elements 1 are inserted in the spaced slots 11, spaces 12 are formed between the porous cathode 4 of each element and the anode 5 of the next adjacent element 1.

Instead of slots 11 in the side walls of container 10, the elements 1 may be provided with lugs on each side which rest on the top of the side walls of container 10 and suspend the elements 1 at the desired depth in the container.

The walls of the container 10 are provided with conduits 13 and 14 communicating with each of the interelectrodic spaces 12 by conduits 13a and 14a. During operation, electrolyte contained in a separate tank or reservoir is circulated into the spaces 12, conduits 13 and 14 being used, respectively, as inlet and outlet for the electrolyte. The terminal element A is electrically connected to the negative terminal post 24 of the battery and the opposite terminal element (not shown in FIG. 3) is connected to positive terminal post 25 of element D shown in FIG. 2.

FIG. 4 is a sectional view of the battery along the line 4—4 of FIG. 3. The box-like elements 1 shown in this figure have inoperative bottom portions 15 extending for a certain distance below the bottom clips 6, which delimit the operative portion of the anode element. The bottom portions 15 extend preferably for a length corresponding to 3 to 5 times the interelectrodic distance between a cathode 4 and an anode 5 (that is, the width of spaces 12 of FIG. 3). This inoperative bottom portion 15 has the function of elongating the electric path for any by-pass current through electrolyte in the space 16.

In a modification, the slots 11 could extend to the bottom of the container 10 to eliminate the space 16. In this instance, the bipolar elements do not need an enlarged inoperative bottom portion 15 as shown in FIG. 4, but could be dimensioned as shown in FIGS. 1 and 2.

However, the box-like bipolar elements 1 preferably do not extend to the bottom of the container 10 but a space 16 is left between the bottom of the bipolar elements 1 and the bottom of the container 10. In this space 16, solid precipitated oxides of the dissolved anodic metal can collect without interfering with the electrodic areas.

When the battery is being recharged by the insertion of new anode sheets 5, the electrolyte is drained, together with precipitated oxides through a suitable valve draining nozzle 26 in the bottom of the container 10.

The gas inlets 7 and outlets 8 of the box-like elements 1 are respectively connected through couplings 17 to a gas distributor pipe 18 and to an exhaust collector pipe 19.

A fan or compressor 20 and throttling valves 21 in the inlet line 22 and the exhaust line 23 cooperate to maintain the desired gas pressure inside the box-like elements 1 of the battery. A cover 9 is provided to avoid electrolyte splashing outside the battery container and the electrolyte in the battery is kept at approximately the level 27 indicated in FIG. 4.

During operation, air, $O_2$, $O_2$-enriched or other depolarizing gas is passed into the interior of the bipolar elements 1 by means of the fan 20 (FIG. 4), or other air or gas-circulating means, and is exhausted under the control of the throttling valve 21. A certain constant, positive gas pressure is maintained inside the elements in order to prevent percolation of the electrolyte through the porous cathodes 4 and to establish a three-phase boundary inside the thickness of the porous cathodes. The pressure varies with the porosity and permeability characteristics of the activated porous cathode and is adjusted so that the electrolyte does not flood the pores of the cathode 4 and the gas does not blow through into the electrolyte.

Zinc is the preferred anode material. However, any electroconductor used in metal oxygen cells, such as metals, metalloids, alloy and heavy metal salts, may be used. The anodes 5 are preferably solid metals, but porous anodes or part-porous and part-solid anodes may be used. The anodes may be flat, slightly curved or corrugated sheets. The anode material must be chemically reactive with the electrolyte and must be more electropositive than oxygen. Alkaline electrolytes such as NaOH, KOH, mixtures of KOH and RbOH and the like, may be used.

When the battery is connected with an external load current flows through the electrolyte contained in the interelectrodic spaces 12 to the zinc anodes 5 and through each conductive, box-like bipolar element 1 to the cathode 4 of the same element, and through the electrolyte contained in the next interelectrodic space to the zinc anode of the next adjacent bipolar element, and so on to the positive terminal element 25 of the battery, which is connected to the external load.

In order to reduce current by-pass through the electrolyte contained in the bottom space 16 of the battery container, the space 16 may be partly filled with insulating packing material such as broken ceramic tubes, etc.

In the embodiment illustrated in FIGS. 5 to 7, individual, vertical, shallow, box-like elements 31 (similar to elements 1 of FIGS. 1 and 2) of a valve metal, nickel, stainless steel or the like, form cathode elements each having a porous front and rear cathode portion 32 and 34, respectively, mounted in a U-section rectangular frame comprising top, bottom and side pieces 33, 33a, 33b and 33c (FIG. 6), preferably formed from one piece of metal. The rectangular cathode portions 32 and 34 are formed of sintered, activated titanium or other valve metal, or nickel or stainless steel impregnated with catalytic materials such as the platinum group metals, oxides of the platinum group metals, mixed oxides thereof and other catalytic oxides such as spinels, perovskites, delafossites, bronzes and the like. The cathode portions 32 and 34 are preferably welded into the frame formed by the U-shaped parts 33, 33a, 33b and 33c.

The inner faces of the sintered cathode portions 32 and 34 are preferably impregnated with a lipophobic (e.g., hydrophobic) resin, such as a flurocarbon resin, in order to make the cathode substantially impermeable to the aqueous electrolyte from the outside, while maintaining unaltered its permeability to gases from the inside. The hydrophobic coating, in conjunction with the positive pressure exerted by the gas inside the box-like elements 31, substantially avoids the percolation of the electrolyte into the box-like elements. However, draining means may be provided in the box-like elements to dispose of minor or accidental flooding of the box-like elements.

Removable and replaceable, consumable anodes 35 are carried on non-consumable, lightweight support sheets 36, of, for example, titanium, titanium coated with tantalum, nickel or other suitable metal, which are fitted into slots or other spacing means 37 in an insulating, plastic battery case 40. The consumable portions 35 of zinc or other consumable anodic material may be electroplated on the support sheets 36, or welded, riveted, rolled, secured by thermoplastic, electrically conductive cement, or otherwise attached on the support sheets. Suitable extractor tools engaging in holes (not shown) in the top portion of the support sheets may be provided to facilitate the removal and reinsertion of the support sheets in the slots 37.

The consumable portions of the anodes 35 are smaller in size than the overall dimensions of the support sheets 36, so that inoperative edge portions are provided around the support sheets which fit into the slots 37 in the battery container.

Inlets 38 for the electrolyte and outlets 39 are provided with branches 38a and 39a for introducing and circulating electrolyte through the battery container. Conventional electrolytes, including the alkaline materials such as sodium hydroxide, potassium hydroxide, mixtures of potassium and rubidium hydroxide and the like, may be used. Acid electrolytes, including sulfuric acid, phosphoric acid and hydrochloric acid can be employed. Depending upon the particular electrolyte used, different anode materials can be selected.

Box-like cathode elements 30A, 30B, 30C to 30D (FIG. 5) are mounted in slots 41 in the battery case 40 with each sintered cathode 32 and 34 facing double-faced anodes 35 on the adjacent support sheet 36, except for the first (cathode) and last (anode) element. The first element, 30A, of the series, has an imperforate end wall (in place of the sintered, porous portion 34 of the other elements,) which imperforate end wall is adjacent an end wall of the battery case 40. Similarly, facing the last element 30D is a single anode face 35 on a support sheet 36 and which does not carry a zinc anode on its other face. The last support sheet 36 fits into a slot 37 at the opposite end of the battery case from the element 30A. Intermediate cathode elements 30B, 30C, and so forth, each have porous, sintered cathodes 32 and 34 welded therein, and between each of the intermediate cathode boxes, a support sheet 36 having replaceable, consumable anodes 35 on each side thereof, is inserted.

Any number of anode and cathode elements may be inserted between the two terminal elements.

The element 30B has its porous cathode 32 facing one side of the zinc anode between elements 30B and 30C, and its cathode 34 facing the zinc anode 35 between elements 30A and 30B, and so on throughout the cell to the end element 30D.

The container 40 is preferably made of inert material such as a plastic and its spaced slots 37, 41 do not extend to the bottom of the container 40 so that the anode support sheets 36 and the cathode elements 31 do not extend to the bottom of container 40 but are spaced from the bottom of the container so that the electrolyte can circulate in the electrolyte spaces and below the anode and cathode elements and can be drained through the drain opening 42 when desired.

When the cathode elements 31 are in the slots 41 and the support sheets 36 each with two anode faces 35 are in slots 37, spaces 43 are formed between the porous cathodes 32 and 34 and the anode faces 35 through which the electrolyte circulates. The electrolyte, contained in a separate tank or reservoir, is circulated into the spaces 43, conduits 38 and 39 being used as inlet and outlet, respectively, for the electrolyte.

FIG. 6 is an exploded view of two box-like cathode elements 31 and anodes 35 on support sheets 36, showing the elements in their electrical series spatial relationship. The cathode boxes 31 are connected together by leads 44 leading to the positive terminal (not shown) of the battery, and the anode support sheets 36 are connected by projecting lugs 36a and leads 45, to each other and to the negative terminal of the battery, to which terminals the connections to the load are made. This embodiment operates as a monopolar battery.

The gas inlets 46 and outlets 47 of each box-like cathode element 31 are connected, respectively, through couplings 48 and 48a to a gas distributor pipe 49 and to an exhaust collector pipe 50. A fan or compressor 51 in the inlet line 52 and a throttling valve 53 in the exhaust line 53a cooperate to maintain the desired gas pressure inside the box-like elements 31 of this battery. A cover 54 is provided to avoid electrolyte splashing outside the battery container and the electrolyte in the battery is kept at approximately the level 55 indicated in FIG. 7.

When the battery is connected with an external load, air, $O_2$, $O_2$-enriched or other depolarizing gas is passed into the interior of the elements 31 by means of the fan 51 (FIG. 7) or other air or gas-circulating means, and is exhausted under the control of the throttling valve 53. A certain constant, positive pressure is maintained inside the porous cathode boxes 31 in order to prevent percolation by the electrolyte through the porous cathode faces 32 and 34 and for establishing a three-phase boundary inside the thickness of the porous cathode faces 32 and 34. The pressure applied varies with the porosity and permeability characteristics of the activated porous cathode faces and is adjusted so that the electrolyte does not flood the pores of the cathodes 32 and 34 and the gas does not blow through into the electrolyte.

During operation, current flows, through the electrolyte contained in the interelectrodic spaces 43, from the porous cathodes 32 or 34 to the zinc anode faces 35.

In order to reduce current by-pass through the electrolyte contained in the bottom space 56 of the battery container, the space 56 may be partly filled with insulating packing material such as broken ceramic tubes, etc.

FIG. 8 illustrates a plurality of shallow, box-like bipolar anode/cathode elements with removable and replaceable anodes, disposed inside an insulating plastic battery container 61 provided with gas inlets 62 leading into the interiors 63 of the hollow bipolar, box-like elements 64. The container 61 is provided with a removable cover (not shown), electrical connections (not shown) to and from the terminal anodes and cathodes and gas outlets 65. The inlets 62 and outlets 65 are provided with valves 66 and 66a by which the gas pressure inside the cathodes may be controlled. Container 61 is provided with slots or other spacing means 61a into which the hollow, box-like elements 64 are fitted. Hollow cathode fingers 68 forming the passages for the depolarizing gas are supported from faces 64a of the elements 64, and anodes 69 are supported by the elements 64 between the cathode fingers 68.

FIG. 9 shows in greater detail the construction of the bipolar elements 64 and the hollow cathode fingers 68.

The depolarizing gas entering the hollow bipolar elements 64 flows through openings 67 into the base of tapered fingers 68 formed over the major part of their surfaces of corrosion resistant, porous and gas-permeable metal such as spherical particles of sintered valve metal having a porosity of about 50%, impregnated with an oxygen-reducing catalyst such as the platinum group metals, including platinum black, platinum group metal oxides, and other catalytic metal oxides such as perovskites, delafossites, bronzes, spinel-type oxides and the like, as previously described. These catalysts are capable of reducing $\frac{1}{2}O_2$ to $OH^-$, which reacts with the zinc of anodes 69 according to the reaction given above. This reaction produces zinc oxide, some of which remains in solution in the electrolyte and some of which precipitates as ZnO particles, which remain in the electrolyte until the electrolyte is discharged from the battery during replacement of the zinc anodes 69 to "recharge" the battery.

One side of the anodes 69 fits into insulating guides 70 mounted on side 64a of the hollow bipolar elements 64 and the other side fits into conducting metal clips 71 and 71a mounted on the opposite element 64. Clips 71 and 71a provide support for and electrical contact between anodes 69 and the bipolar elements 64. The opposite faces of elements 64 are connected by edges 72 shown in FIG. 8.

The elements 64 with the hollow cathode fingers 68 are preferably assembled in succession in container 61 (from left to right) as cell units 60A, 60B, 60E, etc. The first cell unit 60A is a cathode half-cell adjacent the left wall of container 1. It is connected to the positive terminal of the battery. The last element 64 at the right of the battery is an anode half-cell; it is of similar box-configuration to the other elements 64 but has no gas inlets/outlets and has imperforate walls. It is connected to the negative terminal of the battery. To assemble the battery, the anodes 69 for cell unit 60A are inserted in the insulating guides 70 and the element 64 of cell 60B is then assembled with the clips 71–71a pushed over the right side of anodes 69 to make electrical contact with the anodes of cell 60A. The same procedure is followed for the assembly of each cell until the desired number of cell units is assembled and placed in the container 61 and the terminal elements are connected into the load circuit. For replacement of the anodes 69 in a given cell of the assembled battery, the battery electrolyte is drained, the cell units are removed from the container 61 and the anodes requiring replacement are pulled apart; the partially consumed anodes 69 are removed from the insulating guides 70 and the specific cell units 60A, 60B, 60E, etc. are reassembled with the clips 71 and 71a gripping the right-hand edge of anodes 69 to restore electrical contact of all the cell units. Alternatively, only the anodes 69 are removed and replaced by new anodes, using a special tool therefor.

The cathode fingers 68 may be slightly tapered to facilitate assembly and disassembly and each may be one tapered finger extending from top to bottom of the cell units 60A, 60B, etc., or a vertical row of round, or conical projections extending from the faces 64a. The tapered interelectrodic gap between the cathode fingers 68 and the anodes 69 is shown exaggerated for better illustration.

During operation, electric current generated by the chemical reactions described above flows from the anodes 69 through clips 71 and 71a to the elements 64, through the connections 72 at each end of elements 64 to the faces 64a, through the cathode fingers 68 and via the electrolyte to the anodes 69 of each element of the battery. Current will continue to flow as described, as long as oxygen is supplied to the cathode fingers 68 from the hollow elements 64 and the anodes 69 remain unconsumed. When one or more of the anodes 69 is consumed, or substantially consumed, the supply of oxygen-containing gas to the elements 64 is stopped, the electrolyte is drained from the cell and the partially consumed anodes are replaced with new anodes.

FIGS. 10 and 11 illustrate a modification of the embodiment illustrated in FIGS. 8 and 9, in which the container 73 has slots or spacers 61a into which the anode/cathode assemblies (similar to 64, 68 and 69 of FIGS. 8 and 9) are removably fitted. The walls of container 73 are provided with conduits 74 and 75 which communicate by channels 74a and 75a with the electrolyte spaces between the anodes 76 and cathode fingers 78. The anodes 76, of zinc or other consumable metal, are mounted on a support consisting of a series of spaced, non-consumable supporting blades or fingers 76a, mounted on or cast integrally with a supporting backplate 77. The zinc anodes 76 are plated or otherwise secured on the blades or fingers 76a. Alternatively, pre-formed zinc sheets can be secured on the blades 76a, or these blades may be in the form of hooks on which pre-formed zinc plates are suspended. The blades 76a and backplate 77 may be made of titanium, nickel or other non-corroding metal. The supporting blades 76a with the consumable metal supported thereon, extend between hollow, porous cathodes 78a in fingers 78. The supporting backplate 77 in removably secured by clips 79, conducting cement or other means, to the impervious wall 80 of box-like elements 81, through which $O_2$ or $O_2$-containing gas flows through passages 82 into the hollow, porous cathode fingers 78, which are constructed similarly to the fingers 68 of FIGS. 8 and 9.

The depolarizing gas is preferably conducted into and out of the gas passage 81 by vertical conduits 83 and 84 connected by slip joints 85 to a gas inlet pipe 86 and an exhaust pipe 87.

During operation, air, $O_2$ or $O_2$-enriched gas is passed into the interior of elements 81 through conduits 83 by a pump 89 (FIG. 11) or other gas-circulating means, and is exhausted through passages 87 by conduits 84, 90. The pressure in elements 81 is controlled by valves 91. A removable cover 92 on the battery container 73 prevents splashing and spillage from the battery. The electrolyte level is maintained at approximately the level of line 93. A space 94 below the electrode bank permits free communication between the electrolyte spaces and a drain valve 95 permits the container 73 to be drained of electrolyte and accumulated oxide of the consumable anodes, when desired.

The cells of this invention have many advantages over prior-known cells. The cell elements can be assembled and the cell remain idle until current is needed by the system, at which time the cells may be quickly activated by supplying electrolyte to the anode/cathode-containing spaces between elements and supplying an oxygen-containing gas to the hollow, porous cathodes to start the reactions described above. Deactivation of the cell during periods in which no electric power is required from the cell requires only that gas flow to the cell be discontinued and the electrolyte drained during the period of idleness or periods of anode replacement.

A common feature of the described embodiments is that the consumable metal anodes are mounted on non-consumable metal supports, the consumable metal anodes being removable from the battery container either alone (as in FIGS. 1-4, and FIGS. 8-9) or together with their supports (as is necessary in FIGS. 5-7 and FIGS. 10-11 and optional in FIGS. 1-4 and FIGS. 8-9).

The consumable anodes may thus be quickly removed and replaced with new or recoated consumable anodes without contacting the cathodes during removal and reinsertion of the anodes so that there is no damage to the cathode element.

While specific embodiments of this invention have been described to illustrate the principles thereof, it will be understood that the invention may be embodied in other forms, sizes and shapes and that this invention is not limited to the specific forms used to illustrate it.

What is claimed:

1. A battery comprising an inert container, housing a plurality of hollow, box-like cathode elements and consumable metal anode elements in spaced relationship, each of said box-like cathode elements having at least one gas-permeable, porous cathode in at least one wall and at least one consumable metal anode separate from and removably supported opposite said gas-permeable, porous cathode, and cathode and anode of adjacent elements being disposed in spaced facing relationship; means to maintain an electrolyte in the spaces between the cathodes and anodes; means to feed a depolarizing gas through the interior of said box-like cathode elements to the porous cathodes; means for collecting precipitated material below said anode and cathode elements, and means to electrically connect said cathode and anode elements to an external load, said anode elements being removable and reinsertable in said container.

2. A battery comprising an inert container, housing a plurality of hollow, box-like cathode elements and consumable metal anode elements in spaced relationship, each of said box-like cathode elements having at least one gas-permeable, porous cathode in at least one wall and at least one consumable metal anode separate from and removably supported opposite said gas-permeable, porous cathode, the cathode and anode of adjacent elements being disposed in spaced facing relationship; means to maintain an electrolyte in the spaces between the cathodes and anodes; means to feed a depolarizing gas through the interior of said box-like cathode elements to the porous cathodes; means for collecting precipitated material below said anode and cathode elements, and means to electrically connect said cathode and anode elements to an external load, said anode elements being removable and reinsertable in said container, said gas-permeable, porous cathodes form a substantial part of one wall of said hollow box-like cathode elements, the opposite wall being impervious and having means for removably supporting a generally flat consumable metal anode on said impervious cathode element wall.

3. The battery of claim 1 in which there is a gas-permeable cathode in both the front and back walls of said hollow, box-like cathode elements, and each anode element comprises consumable metal anodes mounted on opposite sides of a non-consumable metal anode support plate, said non-consumable anode support plates being removable and reinsertable in said container.

4. The battery of claim 2 in which the means for removably supporting the consumable metal anodes on said impervious cathode element wall comprises electrically conductive spring clips disposed adjacent to the edges of said impervious cathode element wall.

5. The battery of claims 1, 2, 3 or 4 in which said container has means in which the hollow box-like cathode elements are slidably received.

6. The battery of claim 3 in which said container has means into which said non-consumable metal anode support plates are slidably received.

7. The battery of claims 1, 2 or 3 in which the porous cathodes comprises a layer of sintered metal particles.

8. The battery of claim 1 in which each hollow box-like element is a bipolar element having a plurality of hollow pervious cathode fingers protruding from one wall and communicating with the interior of said element, and an impervious opposite wall having a plurality of consumable metal anodes removably supported thereon.

9. The battery of claim 8 in which said opposite wall has a plurality of consumable metal anodes projecting at substantially right angles therefrom.

10. A battery comprising a plurality of hollow, box-like bipolar elements operatively located between two terminal elements and housed in a slotted, inert container, each of said bipolar elements having a gas-permeable, porous, gas-depolarized cathode in one wall and a consumable metal anode supported, in electrical conducting relationship with the box-like element on the external surface of the other wall of said box-like element, means to maintain an electrolyte in the space between the gas-depolarized cathode of one of said elements and the consumable metal anode of the adjacent element, means to feed a depolarizing gas into the interior of said box-like bipolar elements and into the interior of the terminal cathodic element, and means to connect said terminal elements to an external load.

11. The battery of claim 10 having means to feed a depolarizing gas into the interior of said box-like elements and to remove gas from said elements, and means to control the gas pressure inside said box-like elements.

12. The battery of claim 10 in which said box-like elements are constructed of a valve metal and the gas-depolarized cathode is made of sintered valve metal having a catalyst thereon.

13. The battery of claim 12 in which the inwardly facing side of said gas-depolarized cathode is impregnated with lipophobic (e.g. hydrophobic) resin.

14. The battery of claim 10 in which the hollow, box-like bipolar elements are made of metals from the group consisting of valve metals and nickel, the porous, gas-permeable cathode is made of sintered valve metal or nickel and is activated with catalytic oxides, and the consumable anodes are made of a metal more electropositive than oxygen.

15. A battery comprising an inert container having a plurality of hollow, box-like cathode elements therein, porous, sintered, gas-permeable, depolarized cathodes on both the front and back faces of said box-like cathode elements, a plurality of anode elements each comprising consumable metal anodes mounted on each side of a non-consumable support plate, means for removably mounting the anode elements and support plates in the container whereby the cathodes and anodes of adjacent elements are disposed in facing relationship, means to circulate an electrolyte in the spaces between the cathodes and anodes, means to feed a depolarizing gas through the interior of said box-like cathode elements to the porous cathodes, means to connect said box-like cathode elements together and to a terminal connected to a load, and means to connect said anode support plates together and to a terminal connected to a load.

16. The battery of claim 15 wherein said means for removably supporting said non-consumable support plates comprise spaced slots in the walls of said battery container in which said support plates are slidably mounted.

17. The battery of claim 15 wherein each porous cathode comprises a wall of sintered metal particles impregnated with a catalyst.

18. The battery of claim 17 in which the inner wall of sintered metal particles forming said cathodes has a lipophobic resin thereon from the group consisting of a polypropylene, polychlorofluoroethylene and vinyl resins, and the resin is on the inner surface of said porous cathodes but is not on the outer surface of the particles of said porous, sintered metal cathodes.

19. A battery comprising an insulating casing, a plurality of hollow, box-like corrosion resistant metal cathode elements having pervious cathode walls therein and a plurality of consumable anodes mounted in spaced relationship in said casing, an electrolyte between the anodes and cathodes, non-consumable support plates on which the consumable anodes are mounted, and means whereby said support plates may be removed from said casing when the anodes are substantially consumed, the consumable metal replaced on said anode support plates, and the recoated support plates reinserted in said casing.

20. A gas-depolarized electrochemical cell comprising an insulating cell container, a plurality of cell units in said container, each full cell unit comprising a hollow element for receiving a depolarizing gas, means to introduce and remove gas from said elements, electrolyte chambers between said elements, hollow, porous fingers of controlled porosity extending from a first wall of each element into said electrolyte chambers, said hollow, porous fingers forming the cathodes of said cell units, consumable metal anodes in said electrolyte chambers forming an electrode gap with adjacent hollow, porous cathode fingers, insulating guides on said first walls of said hollow elements between said hollow cathode fingers into which one edge of said consumable metal anodes is inserted, clips of a conducting metal on the opposite walls of the hollow elements making electrical contact with the edges of said consumable anodes opposite said insulating guides, an electrolyte in said electrolyte chambers, and means to pass a depolarizing gas through said hollow elements into said hollow, porous cathode fingers.

21. The cell of claim 20 in which a half-cell unit at each end of said container has negative and positive terminals connecting the cell to an external load.

22. The cell of claim 20 in which the means to introduce and remove depolarizing gas from said elements is provided with means to maintain the gas in said elements at a substantially constant superatmospheric pressure.

23. The method of operating an electrochemical cell comprising a slotted container having hollow, box-like, metal cathode elements carrying porous, oxygen-reducing cathodes on at least one side of said box-like elements and consumable anodes removably mounted on non-consumable supports opposite said oxygen-reducing cathodes, an electrolyte in the spaces between said anodes and said oxygen-reducing cathodes; means to circulate a depolarizing gas through said cathode elements and means to supply an electrolyte to said cell, which comprises discharging current from said cell until one or more of said anodes are substantially consumed, draining said electrolyte and consumed anode material from said container, removing the remaining parts of the consumable anodes from said container, replacing the consumed anodes with new anodes and reintroducing an electrolyte into said container.

24. The method of claim 23 in which the cathode elements are a non-consumable metal from the group consisting of valve metals and nickel, the oxygen-reducing cathode is porous, sintered valve metal or nickel, and the anode is zinc and is removably attached to one side of each of said box-like cathode elements.

25. As a product of manufacture, a bipolar element for a battery, comprising a hollow metal box-like structure carrying a porous, oxygen-reducing cathode on one side of said box-like element and a consumable anode removably mounted on the other side of said box-like bipolar element and means to circulate an oxygen-containing gas through said box-like structure.

26. The product of claim 25 in which the consumable anode is from the group consisting of solid or porous zinc, iron, cadmium, and metalloids and alloys thereof.

27. A battery comprising an inert container, housing a plurality of hollow box-like cathode elements and consumable metal anode elements in spaced relationship between a terminal consumable metal anode element and a terminal hollow cathode element, each of said box-like cathode elements having at least one gas-permeable, porous cathode in at least one wall, and each anode element comprising at least one consumable metal anode mounted on a non-consumable metal support; means to removably mount at least said consumable metal anodes of the anode elements in the container to permit removal and insertion of the consumable metal anodes in the container; means to maintain an electrolyte in the spaces between the cathodes and anodes; means to feed a depolarizing gas through the interior of said hollow cathode elements to the porous cathodes; and means to connect said terminal elements to an external load.

* * * * *

UNITED STATES PATENT AND TRADEMARK OFFICE
CERTIFICATE OF CORRECTION

PATENT NO. : 4,246,324
DATED : January 20, 1981
INVENTOR(S) : Vittorio de Nora et al.

It is certified that error appears in the above—identified patent and that said Letters Patent is hereby corrected as shown below:

Column 3, lines 2 and 4: "2O $H^{31}$" should read -- $2OH^{-}$ --.

line 44: "reactons" should read -- reactions --.

Signed and Sealed this

Fourteenth Day of July 1981

[SEAL]

Attest:

GERALD J. MOSSINGHOFF

*Attesting Officer*  *Commissioner of Patents and Trademarks*